United States Patent [19]

Gowing

[11] 4,432,157
[45] Feb. 21, 1984

[54] FISHING LURE

[75] Inventor: James R. Gowing, Altus, Ark.

[73] Assignee: EBSCO Industries, Inc., Birmingham, Ala.

[21] Appl. No.: 424,325

[22] Filed: Sep. 27, 1982

[51] Int. Cl.³ .............................................. A01K 85/00
[52] U.S. Cl. .................................. 43/42.31; 43/42.34; 43/42.35; 43/42.52
[58] Field of Search .................. 43/42.31, 42.5, 42.52, 43/42.34, 42.35

[56] References Cited

U.S. PATENT DOCUMENTS

| | | | |
|---|---|---|---|
| 1,862,036 | 6/1932 | Schilpp | 43/42.34 |
| 2,117,206 | 5/1938 | Neff | 43/42.34 |
| 2,192,563 | 3/1940 | Starkey | 43/42.34 |
| 2,705,848 | 4/1955 | Stettner | 43/42.52 |
| 2,989,816 | 6/1961 | Ebert | 43/42.52 |
| 3,091,049 | 5/1963 | Reimers | 43/42.5 |
| 3,662,485 | 5/1972 | Klemkowski | 43/42.45 |
| 3,896,580 | 7/1975 | Williams | 43/42.34 |

Primary Examiner—Gene P. Crosby
Attorney, Agent, or Firm—Woodford R. Thompson, Jr.

[57] ABSTRACT

A fishing lure embodies an elongated body having a fishing line attached to its front end portion and a rearwardly and upwardly extending hook carried by its rear end portion. A plurality of movable weights are mounted within an enclosed cavity provided in the body. The cavity and weights are formed and arranged to permit the weights to move within the cavity and cause the body to oscillate about an elongated axis extending above the longitudinal center line of the lure to thus produce a unique sound, appearance and disturbance in the water which attracts fish.

4 Claims, 10 Drawing Figures

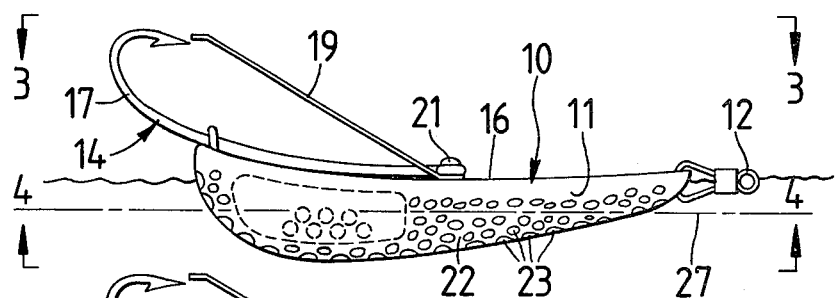
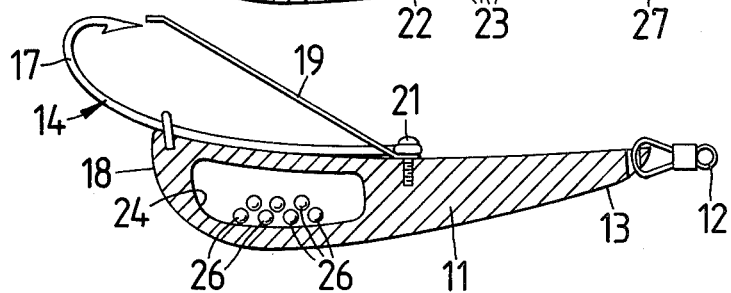
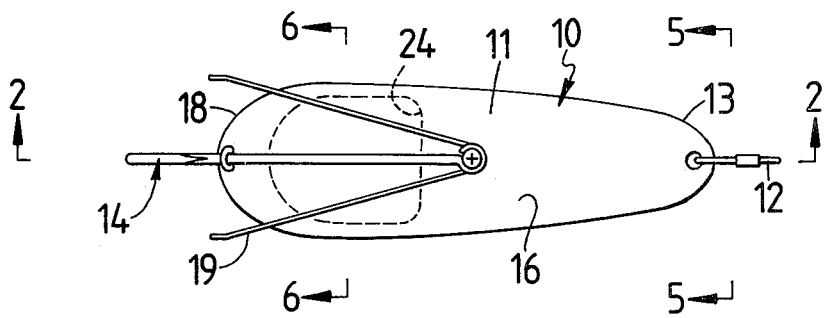
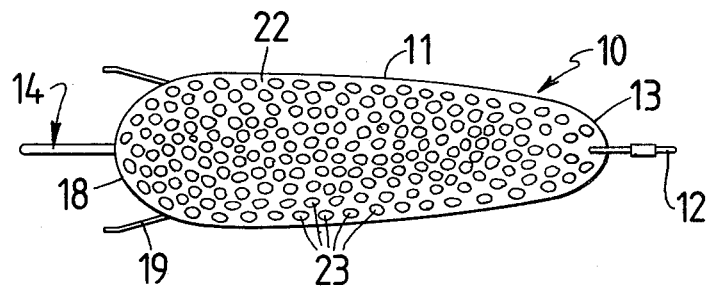
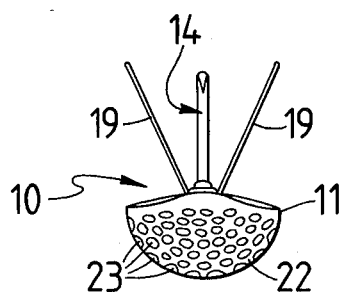
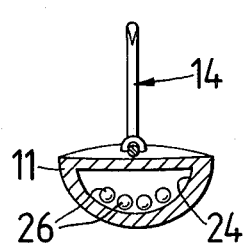
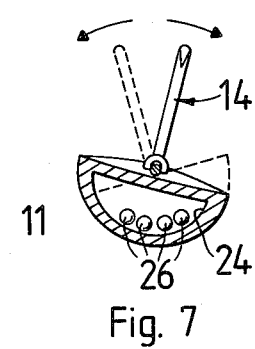

4,432,157

FISHING LURE

BACKGROUND OF THE INVENTION

This invention relates to a fishing lure and more particularly to an improved spoon type fishing lure having novel means for producing a distinct oscillating movement and rattling sound that is very attractive to fish each time the lure is pulled through the water.

Heretofore in the art to which my invention relates, various spoon type fishing lures have been proposed to be pulled through the water and attract fish. Such lures have not been entirely satisfactory for the reason that the movement they produce is not always attractive to fish. That is, when conventional spoon type lures with which I am familiar float at rest their reflective outer surfaces face upwardly and outwardly of the water and their hooks face downwardly into the water so that, upon being pulled through the water, they produce a slight wobbling movement that is not very attractive to fish. Also, the light reflected by such conventional lures is not directed downwardly into the water to attract fish.

SUMMARY OF THE INVENTION

In accordance with my present invention, I overcome the above and other difficulties by providing an improved spoon type fishing lure which produces a distinct oscillating movement and rattling sound that is attractive to fish each time the lure is pulled through the water.

My improved fishing lure comprises an elongated, generally oval-shaped body, as viewed from the top, having a reflecting lower curved surface. A fishing hook is carried by the upper surface of the body in position for the curved portion of the hook to extend rearwardly and upwardly from the rear end of the body. A plurality of movable weights are mounted within an enclosed cavity in the body with the weights and cavity being formed and arranged for the weights to move within the cavity in response to movement of the body through the water. The movement of the weights within the cavity oscillates the body about an elongated axis that extends above the longitudinal center line of the body to thus produce a rattling sound that is attractive to fish.

DESCRIPTION OF THE DRAWING

A fishing lure embodying features of my invention is illustrated in the accompanying drawing, forming a part of this application, in which:

FIG. 1 is a side elevational view showing my improved fishing lure adjacent the surface of the water;

FIG. 2 is a sectional view taken generally along the line 2—2 of FIG. 3;

FIG. 3 is a top plan view taken generally along the line 3—3 of FIG. 1;

FIG. 4 is a bottom plan view taken generally along the line 4—4 of FIG. 1;

FIG. 5 is an end view taken generally along the line 5—5 of FIG. 3;

FIG. 6 is a sectional view taken generally along the line 6—6 of FIG. 3;

FIG. 7 is a sectional view corresponding to FIG. 6 showing the oscillating movement of my improved fishing lure;

DETAILED DESCRIPTION

Figure 8:
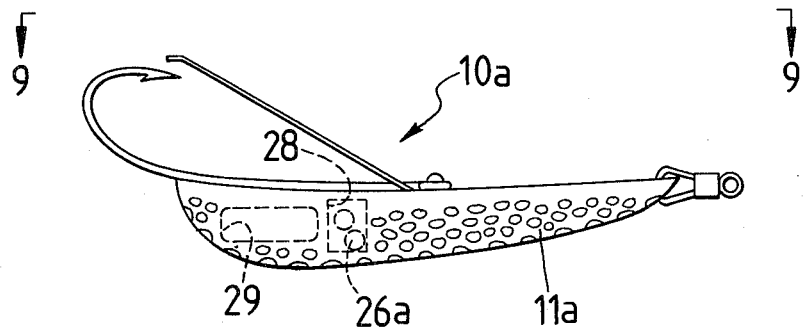
FIG. 8 is a side elevational view showing a modified form of my invention.

Referring now to the drawing for a better understanding of my invention, I show in FIGS. 3 and 4 my improved spoon type fishing lure indicated generally at 10 and comprising an elongated, generally oval-shaped body 11, as viewed from the top, having an eyelet 12 at its front end 13 for detachably connecting the body to a fishing line, not shown. A fishing hook 14 is secured to the generally flat upper surface 16 of the body 11 with the curved portion 17 of the hook extending rearwardly and upwardly from the rear end 18 of the body, as shown in FIGS. 1 and 2. The hook 14 may also include two rearwardly and upwardly extending wire-like weed guards 19 which are secured to the hook 14 and the body 11 by a retainer element 21.

The body 11 is provided with a lower curved portion that has a reflective surface 22 which reflects light downwardly into the water so as to attract fish. Preferably, a multiplicity of dimples 23 are provided in the lower surface 22 of the body 11 to distort the angle of reflection of the light rays striking the lower surface whereby a bright and shiny image is created that is attractive to fish.

As shown in the drawing, an enclosed elongated cavity 24 is provided in the rear portion of the body 11 below the longitudinal center line of the lure. Mounted within the cavity 24 are a plurality of movable weights 26 which are preferably in the form of ball-like members. The cavity 24 and weights 26 are constructed and arranged to permit the weights 26 to move within the cavity from one side of the lure to the other side thereof and thus impart oscillation to the body 11 about an elongated axis which extends above the longitudinal center line of the lure, as shown by the dot-dash line 27 in FIG. 1. That is, each time the lure reaches one high point of its oscillation about its axis of rotation, the weights cause that side of the lure to move downwardly as the weights fall back toward the lowest or other side of the lure, thus causing the lure to rotate to the other high point of its oscillation. This oscillation of the lure produces a rattling sound that is attractive to fish.

From the foregoing description, the operation of my improved spoon type fishing lure shown in FIGS. 1–7 will be readily understood. With the lure 10 attached to a fishing line, the fisherman casts the lure into the water and allows it to come to rest in the water, as shown in FIG. 1. As the lure 10 is retrieved, the movement imparted to the lure by its movement through the water causes the weights 26 to move from one side of the lure to the other side thereof and oscillate the lure about its axis of rotation, as shown in FIG. 7. The movement of the weights 26 within the cavity 24 also creates a rattling sound that, when combined with the oscillating movement of the body 11, produces a unique sound, appearance and disturbance in the water that is very attractive to fish.

Figure 9:
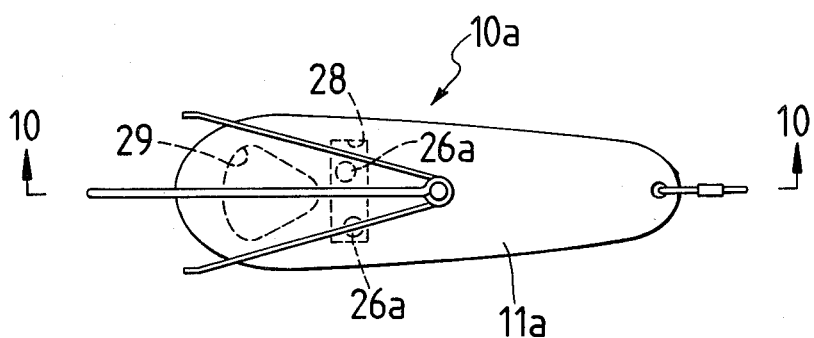
FIG. 9 is a top plan view taken generally along the line 9—9 of FIG. 8.
Figure 10:
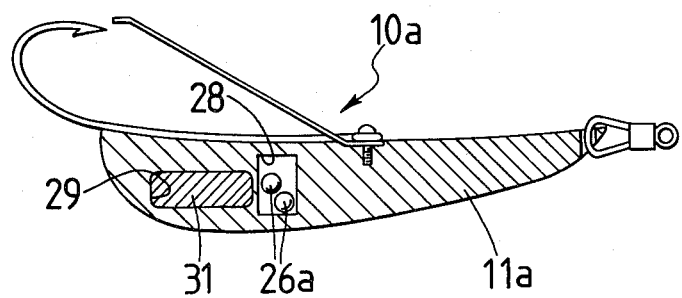
FIG. 10 is a sectional view taken generally along the line 10—10 of FIG. 9.

Referring now to FIGS. 8, 9 and 10, I show a modified form of my improved fishing lure indicated generally at 10a. The lure 10a is identical in structure to the lure 10 described above except that the body 11a of the lure 10a is provided with a pair of cavities 28 and 29 between the mid portion and rear end of the lure. Mounted within the forwardmost cavity 28 are a plurality of movable weights 26a which are preferably in the form of ball-like members. The cavity 28 and weights 26a are formed and arranged to permit the weights to move within the cavity from one side of the lure to the other side thereof and impart oscillation to the body 11a in a similar manner as described above relative to the first embodiment. The movement of the weights 26a within the cavity 28 also creates a rattling sound that is attractive to fish. Mounted within the rearmost cavity 29 is a stationary weight 31 which urges the lure 10a downwardly.

From the foregoing description, the operation of my improved spoon type fishing lure 10a will be readily understood. With the lure 10a attached to a fishing line, the fisherman casts the lure 10a into the water allowing it to sink to a desired depth. As the lure is retrieved, the movement imparted to the lure by its movement through the water causes the weights 26a to move from one side of the lure to the other side thereof and oscillate the lure in a similar manner as described above. The movement of the weights 26a within the cavity 28 also creates a rattling sound that is attractive to fish. When the fisherman intermittently stops reeling in his line during retrieval, the stationary weight 31 causes the lure to move downwardly in the water. The oscillating movement imparted to the body 11a by the weights 26a, when combined with the intermittently downward movement of the lure during retrieval, produces a unique sound, appearance and disturbance in the water that is very attractive to fish.

From the foregoing, it will be seen that I have devised an improved fishing lure which produces a very distinct rattling sound and oscillating movement that is attractive to fish. Also, by providing a fishing lure having a lower curved reflective surface, I provide a lure that reflects light downwardly into the water to create an effect which attracts fish.

While I have shown my invention in two forms, it will be obvious to those skilled in the art that it is not so limited, but is susceptible of various other changes and modifications without departing from the spirit thereof.

What I claim is:

1. A fishing lure comprising,
   (a) an elongated body having means at the front end thereof for attaching a fishing line,
   (b) a rearwardly and upwardly extending fishing hook carried by the upper rear portion of said body,
   (c) there being at least one enclosed cavity within said body, and
   (d) a plurality of movable weights within said cavity with said cavity and said weights being formed and arranged for said weights to move within said cavity in response to movement of said body through the water with the movement of said weights oscillating said body about an elongated axis of rotation extending above the longitudinal center line of said body to produce a rattling sound attractive to fish.

2. A fishing lure as defined in claim 1 in which said body is provided with a lower curved surface having a multiplicity of dimples therein which are arranged to distort the angle of reflection of light rays striking said lower surface to produce an effect which is attractive to fish.

3. A fishing lure as defined in claim 1 in which said movable weights are ball-like members.

4. A fishing lure as defined in claim 1 in which a stationary weight is provided in said body rearwardly of said cavity.

* * * * *